US012649277B2

(12) United States Patent (10) Patent No.: US 12,649,277 B2

Hashimoto et al. (45) Date of Patent: Jun. 9, 2026

(54) SHAPING METHOD AND SHAPING DEVICE

(71) Applicant: FUJI CORPORATION, Chiryu (JP)

(72) Inventors: Yoshitaka Hashimoto, Kariya (JP);
Ryojiro Tominaga, Okazaki (JP)

(73) Assignee: FUJI CORPORATION, Chiryu (JP)

( * ) Notice: Subject to any disclaimer, the term of this
patent is extended or adjusted under 35
U.S.C. 154(b) by 69 days.

(21) Appl. No.: 18/838,292

(22) PCT Filed: Mar. 3, 2022

(86) PCT No.: PCT/JP2022/009157
§ 371 (c)(1),
(2) Date: Aug. 14, 2024

(87) PCT Pub. No.: WO2023/166669
PCT Pub. Date: Sep. 7, 2023

(65) Prior Publication Data
US 2025/0153430 A1 May 15, 2025

(51) Int. Cl.
| | |
|---|---|
| *B29C 64/194* | (2017.01) |
| *B29C 64/124* | (2017.01) |
| *B29C 64/218* | (2017.01) |
| *B33Y 10/00* | (2015.01) |
| *B33Y 30/00* | (2015.01) |
| *B33Y 40/00* | (2020.01) |

(52) U.S. Cl.
CPC .......... *B29C 64/194* (2017.08); *B29C 64/124*
(2017.08); *B29C 64/218* (2017.08); *B33Y*
*10/00* (2014.12); *B33Y 30/00* (2014.12); *B33Y*
*40/00* (2014.12)

(58) Field of Classification Search
CPC ....... B29C 64/106; B29C 64/10; B29C 70/30;
B29C 64/124; B29C 66/03241; B29C
53/16; B29C 53/00; B29C 48/0019; B29C
64/214; B29C 64/205; B29C 64/20; B29C
64/194
See application file for complete search history.

(56) References Cited

FOREIGN PATENT DOCUMENTS

JP          2018-114657 A          7/2018

OTHER PUBLICATIONS

International Search Report issued May 10, 2022 in PCT/JP2022/
009157, filed on Mar. 3, 2022, 2 pages.

*Primary Examiner* — Stella K Yi
(74) *Attorney, Agent, or Firm* — Oblon, McClelland,
Maier & Neustadt, L.L.P.

(57) ABSTRACT

A shaping method and a shaping device to reduce an
influence of a raised portion of a semi-cured layer on an
upper layer. The shaping method repeatedly executes a first
discharging step, a first flattening step, and a first curing step
to form a first flattening layer on a stage. A second discharg-
ing step and the semi-curing step are repeatedly executed to
form a semi-cured layer on the stage. A third discharging
step discharges the first curable viscous fluid onto the
smooth layer, a third flattening step flattening the first
curable viscous fluid discharged in the third discharging
step, by the flattening member, by increasing the number of
scans of flattening by the flattening member to be larger than
that in the first flattening step, and a third curing step of
curing the first curable viscous fluid flattened in the third
flattening step.

8 Claims, 11 Drawing Sheets

SHAPING METHOD AND SHAPING DEVICE

TECHNICAL FIELD

The present disclosure relates to a shaping method and a shaping device that perform shaping using curable viscous fluid.

BACKGROUND ART

Conventionally, there has been developed a technique related to a shaping method for shaping a shaped object by using curable viscous fluid such as an ultraviolet curing resin. Specifically, in this shaping method, for example, curable viscous fluid is discharged by a discharging device, the discharged curable viscous fluid is cured by irradiation with ultraviolet rays, and a desired shaped object is shaped with a cured layer that has been cured. In the following Patent Literature 1, a first unit layer to which an ultraviolet curing resin has been discharged is semi-cured by irradiating the first unit layer with ultraviolet rays, and a flattening process of the first unit layer is performed by a flattening roller unit.

PATENT LITERATURE

Patent Literature 1: JP-A-2018-114657

BRIEF SUMMARY OF THE INVENTION

Technical Problem

In the above-described semi-curing step of the ultraviolet curing resin, a locally raised portion may be formed by a surface tension of the ultraviolet curing resin. For example, an end portion of the shaped object or a central portion of the shaped object having a small width of several mm or less becomes higher than a target height in the design data due to the surface tension. As a result, a shape of an upper layer and a shape of a shaped object of a finished product may be affected by the locally raised portion.

The present disclosure has been made in view of such circumstances, and an object thereof is to provide a shaping method and a shaping device capable of reducing an influence of a raised portion of a semi-cured layer on an upper layer.

Solution to Problem

In order to solve the above problem, according to an aspect of the present disclosure, there is provided a shaping method including: a first discharging step of discharging first curable viscous fluid from above a stage; a first flattening step of flattening the first curable viscous fluid discharged in the first discharging step by a flattening member; a first curing step of curing the first curable viscous fluid flattened in the first flattening step; a first flattening layer forming step of forming a first flattening layer on the stage by repeatedly executing the first discharging step, the first flattening step, and the first curing step; a second discharging step of discharging second curable viscous fluid from above the stage; a semi-curing step of semi-curing the second curable viscous fluid discharged in the second discharging step; a semi-cured layer forming step of forming a semi-cured layer on the stage by repeatedly executing the second discharging step and the semi-curing step; a second flattening step of flattening the semi-cured layer by the flattening member; a second curing step of curing the semi-cured layer flattened in the second flattening step to form a smooth layer; a third discharging step of discharging the first curable viscous fluid onto the smooth layer cured in the second curing step; a third flattening step of providing the flattening member at a height corresponding to a height of a raised portion formed on the smooth layer and flattening the first curable viscous fluid discharged in the third discharging step, by the flattening member, by increasing the number of scans of flattening by the flattening member to be larger than that in the first flattening step; a third curing step of curing the first curable viscous fluid flattened in the third flattening step; and a second flattening layer forming step of forming a second flattening layer on the smooth layer by repeatedly executing the third discharging step, the third flattening step, and the third curing step.

The content of the present disclosure is not limited to being implemented as the shaping method, and it is extremely effective to be implemented as a shaping device including a discharging device, a roller, a curing device, and a control device.

Advantageous Effects

With the manufacturing method and the manufacturing device of the present disclosure, when the first curable viscous fluid discharged onto the smooth layer is flattened, the flattening member is disposed at the height corresponding to the height of the raised portion of the smooth layer to flatten the first curable viscous fluid. The flattening can be performed by bringing the flattening member into contact with the first curable viscous fluid discharged onto the raised portion while avoiding interference between the raised portion and the flattening member. In addition, by increasing the number of scans of the flattening, the total time during which the first curable viscous fluid discharged onto the raised portion and the flattening member are in contact with each other can be increased, and by removing the excess first curable viscous fluid, an increase in the raised portion can be suppressed. As a result, the influence of the raised portion of the smooth layer obtained by curing the semi-cured layer on an upper layer can be reduced.

DESCRIPTION OF EMBODIMENTS (1. Configuration of Shaping Device 10)

Figure 1:
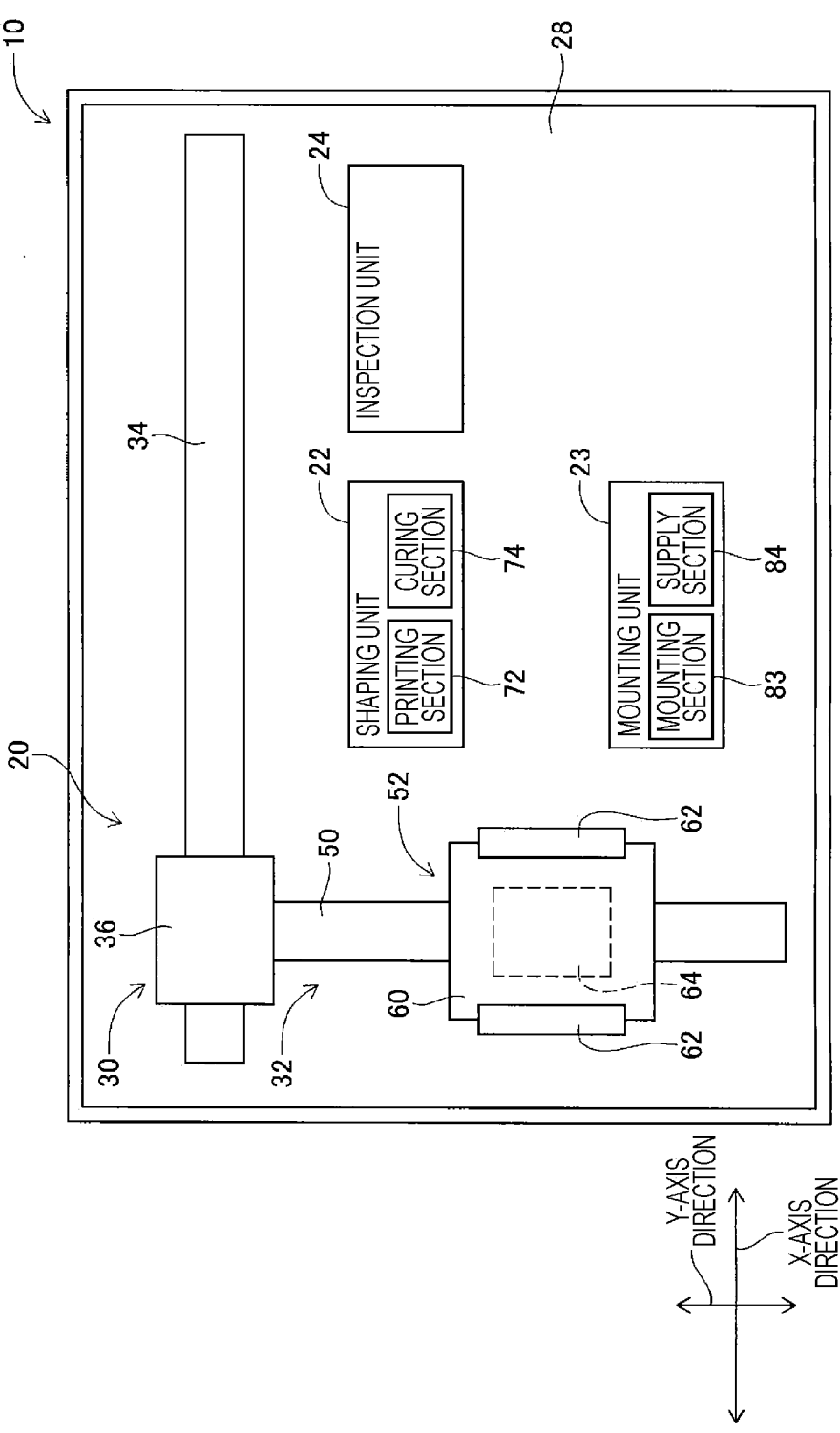
FIG. 1 is a diagram illustrating a shaping device according to the present embodiment.

Hereinafter, a shaping method and a shaping device according to an embodiment of the present disclosure will be described. FIG. 1 illustrates shaping device 10 according to the present embodiment. As illustrated in FIG. 1, shaping device 10 includes conveyance device 20, shaping unit 22, mounting unit 23, inspection unit 24, and control device 26 (refer to FIG. 2). Conveyance device 20, shaping unit 22, mounting unit 23, and inspection unit 24 are disposed on base 28 of shaping device 10. Base 28 generally has a rectangular shape. In the following description, a longitudinal direction of base 28 will be referred to as an X-axis direction, a transverse direction of base 28 will be referred to as a Y-axis direction, and a direction orthogonal to both the X-axis direction and the Y-axis direction will be referred to as a Z-axis direction.

Conveyance device 20 includes X-axis slide mechanism 30 and Y-axis slide mechanism 32. X-axis slide mechanism 30 includes X-axis slide rail 34 and X-axis slider 36. X-axis slide rail 34 is disposed on base 28 to extend in the X-axis direction. X-axis slider 36 is held by X-axis slide rail 34 to be slidable in the X-axis direction. Furthermore, X-axis slide mechanism 30 includes electromagnetic motor 38 (refer to FIG. 2) and moves X-axis slider 36 to any position in the X-axis direction by driving electromagnetic motor 38.

In addition, Y-axis slide mechanism 32 includes Y-axis slide rail 50 and stage 52. Y-axis slide rail 50 is disposed to extend in the Y-axis direction on base 28. One end portion of Y-axis slide rail 50 in the Y-axis direction is coupled to X-axis slider 36. Consequently, Y-axis slide rail 50 is configured to be movable in the X-axis direction in accordance with sliding movement of X-axis slider 36. Stage 52 is held to be slidable in the Y-axis direction by Y-axis slide rail 50. Y-axis slide mechanism 32 has electromagnetic motor 56 (refer to FIG. 2), and moves stage 52 to any position in the Y-axis direction by driving electromagnetic motor 56. Consequently, stage 52 can be moved to any position in the X-axis direction and the Y-axis direction on base 28 by driving X-axis slide mechanism 30 and Y-axis slide mechanism 32.

Stage 52 includes base table 60, holding device 62, and lifting and lowering device 64. Base table 60 is formed in a flat plate shape, and base member 70 (refer to FIG. 5) is placed on an upper surface thereof. Base member 70 is, for example, a plate made of a metal such as iron or stainless steel. Holding devices 62 are provided on both side portions of base table 60 in the X-axis direction. Base member 70 is placed on base table 60 and is fixedly held with respect to base table 60 by sandwiching both edge portions in the X-axis direction by holding device 62. Lifting and lowering device 64 is disposed below base table 60 to lift and lower base table 60 in the Z-axis direction.

Figure 5:
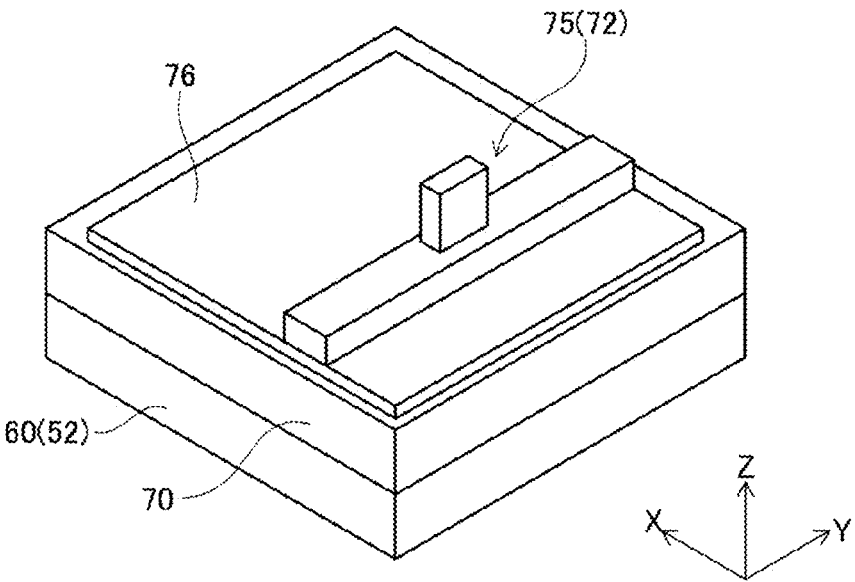
FIG. 5 is a schematic diagram illustrating a state in which an ultraviolet curing resin is being discharged from an ink jet head.

Shaping unit 22 is a unit that shapes a structure on base member 70 placed on base table 60 of stage 52, and includes printing section 72 and curing section 74. As illustrated in FIG. 5, printing section 72 has ink jet head 75, and discharges fluid in a thin film form on base member 70 placed on base table 60. As the fluid discharged by ink jet head 75, ultraviolet curing resin 76 (refer to FIG. 5) that is cured by ultraviolet rays may be employed. Ultraviolet curing resin 76 is an example of first and second curable viscous fluid of present disclosure. As the curable viscous fluid, other viscous fluid such as a thermosetting resin may be employed in addition to an ultraviolet curing resin.

Figure 13:
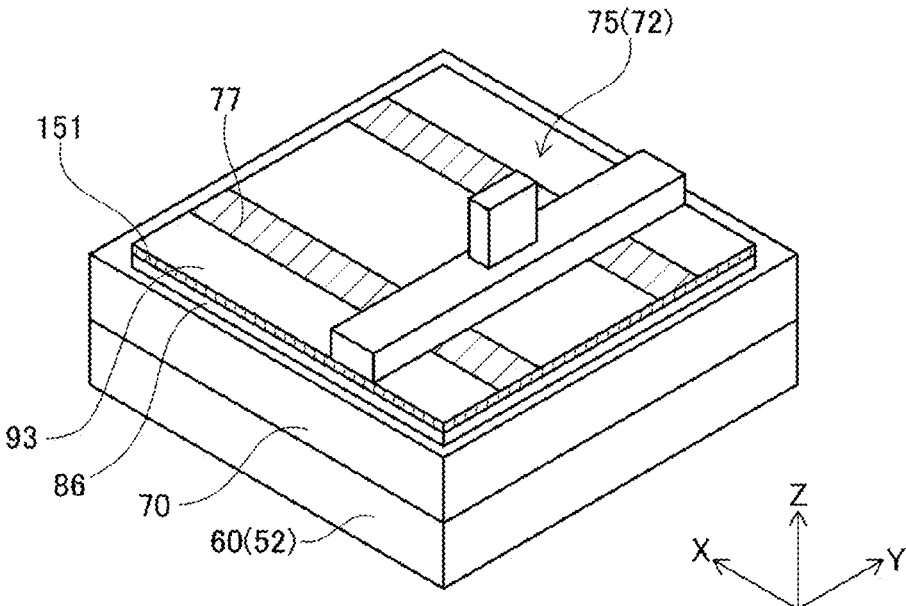
FIG. 13 is a schematic diagram illustrating a state in which metal ink is discharged.

Ink jet head 75 is capable of discharging, for example, metal ink 77 in addition to ultraviolet curing resin 76 (refer to FIG. 13). Metal ink 77 is an example of fluid containing metal particles of the present disclosure. Metal ink 77 is, for example, one in which fine particles of a metal (such as silver) having a nanometer size are dispersed in a solvent, and is cured by baking with heat. The surface of the metal fine particle is coated with, for example, a dispersant to suppress aggregation in the solvent.

When ink jet head 75 discharges ultraviolet curing resin 76, ultraviolet curing resin 76 is discharged from multiple nozzles by, for example, a piezo method using a piezoelectric element. Note that ink jet head 75 may discharge ultraviolet curing resin 76 from multiple nozzles by a thermal method of heating ultraviolet curing resin 76 to generate bubbles and performing discharging from the nozzles. In a case of discharging metal ink 77, ink jet head 75 discharges metal ink 77 from multiple nozzles, for example, according to a piezo method using piezoelectric elements. A discharging device is not limited to ink jet head 75 including multiple nozzles, and may be, for example, a dispenser including a single nozzle. Ink jet head 75 may separately include a nozzle discharging metal ink 77 and a nozzle discharging ultraviolet curing resin 76, or may share a nozzle discharging two viscous fluid. In the following description, ultraviolet curing resin 76 and metal ink 77 may be collectively referred to as viscous fluid.

Figure 2:
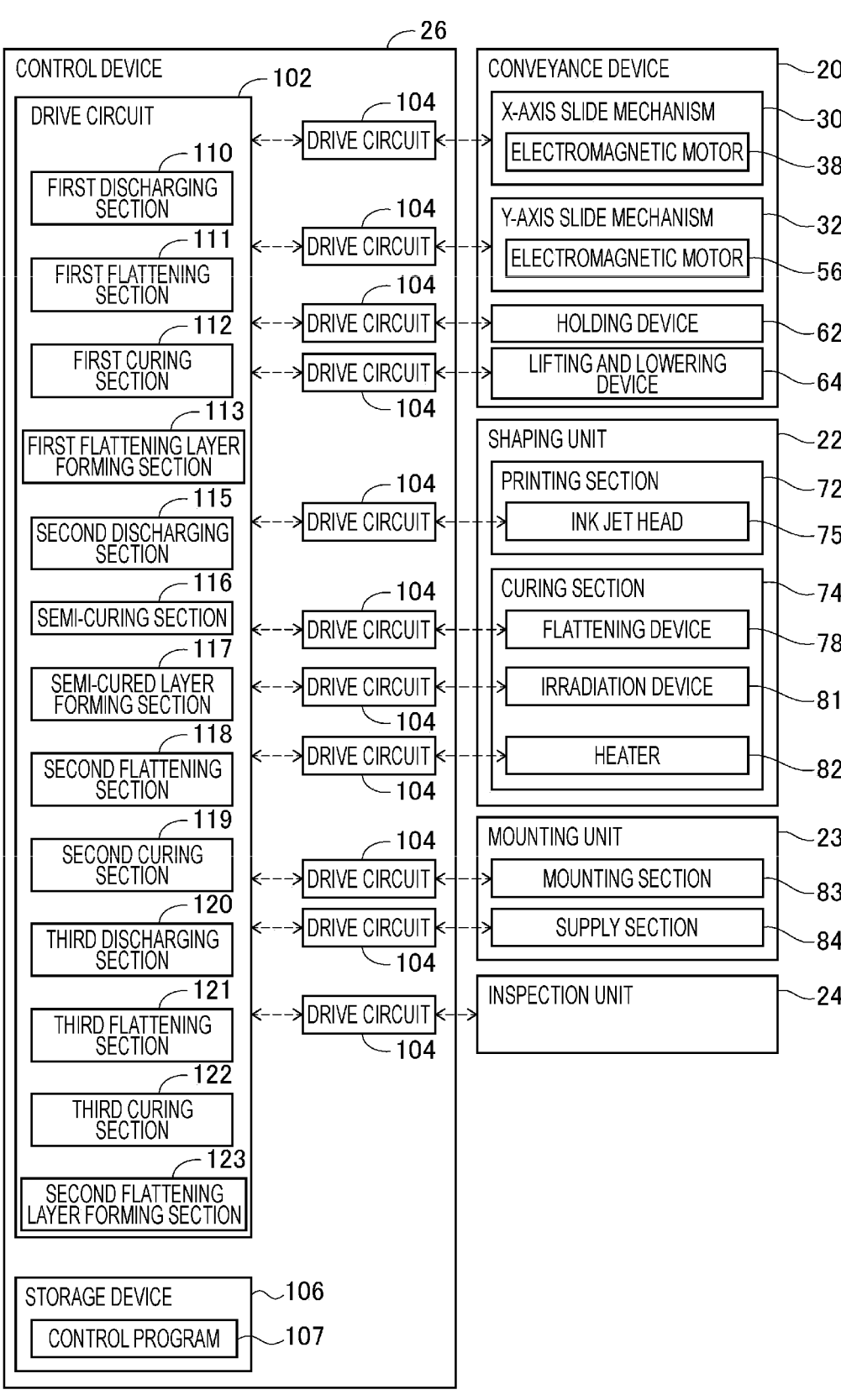
FIG. 2 is a block diagram illustrating a control device.
Figure 6:
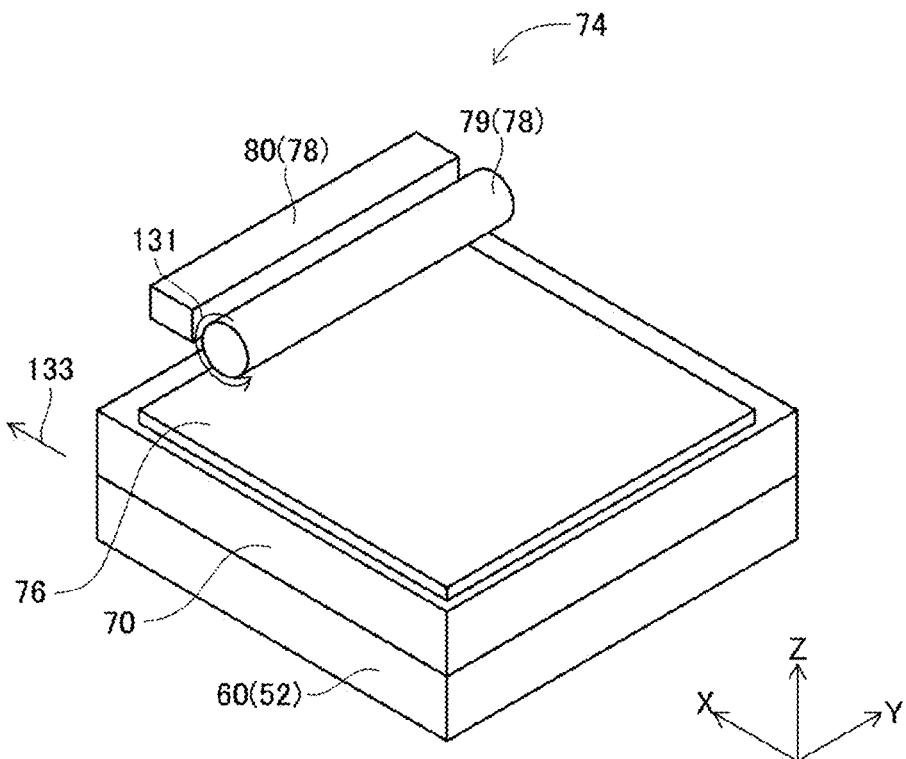
FIG. 6 is a schematic diagram illustrating a state in which an ultraviolet curing resin is being flattened by a flattening device.

As illustrated in FIG. 2, curing section 74 includes flattening device 78, irradiation device 81, and heater 82. Flattening device 78 is a device which flattens an upper surface of ultraviolet curing resin 76 or metal ink 77 discharged onto base member 70 by ink jet head 75. Flattening device 78 includes roller 79 and collection section 80 (refer to FIG. 6). Roller 79 has, for example, a cylindrically columnar shape, and rotates in contact with the viscous fluid (ultraviolet curing resin 76 or metal ink 77) in a flowable state based on the control of flattening device 78, and flattens the viscous fluid while transferring the excess viscous fluid. Collection section 80 has, for example, a blade protruding toward the surface of roller 79, scrapes the viscous fluid transferred to roller 79 by the blade, stores the viscous fluid scraped by the blade, and discharges the viscous fluid. Collection section 80 discharges, for example, the collected viscous fluid to a waste liquid tank. Flattening device 78 flattens the surface of the viscous fluid by scraping the excess viscous fluid while leveling the surface of the viscous fluid.

Flattening device 78 is not limited to a configuration in which the flattening is performed by roller 79. For example, flattening device 78 may have a configuration in which a plate-shaped member such as a squeegee comes into contact with the surface of the viscous fluid to perform the flattening. Alternatively, flattening device 78 may have a configuration for leveling the surface of the viscous fluid by using a brush or a rake. Collection section 80 may return the collected viscous fluid to a supply tank again. The flattening by flattening device 78 needs not be performed every time the viscous fluid is discharged. For example, the flattening may be performed only when a specific layer is formed.

Irradiation device 81 irradiates, for example, ultraviolet curing resin 76 discharged onto base member 70 with ultraviolet rays. Ultraviolet curing resin 76 is cured by irradiation with ultraviolet rays to form a thin insulating layer (first flattening layer 86 in FIG. 7, or the like). Heater 82 is a device that heats discharged metal ink 77. Metal ink 77 is baked by heat being applied from heater 82 to form a metal wire. Baking of metal ink 77 is, for example, a phenomenon in which evaporation of a solvent or decomposition of a protective film of metal fine particles, that is, a dispersant is performed by applying energy, so that conductivity is increased by contacting or fusing the metal fine particles. The metal wire may be formed by baking the metal ink. Details of a shaping method will be described later. A device heating metal ink 77 is not limited to heater 82. For example, shaping device 10 may include a laser irradiation device that irradiates metal ink 77 with laser light as a device that heats metal ink 77, or an atmosphere furnace that heats first flattening layer 86 onto which metal ink 77 is discharged inside the furnace.

Mounting unit 23 illustrated in FIG. 1 is, for example, a unit that mounts various electronic components connected to the metal wire shaped by shaping unit 22, and includes mounting section 83 and supply section 84. Mounting section 83 has, for example, a suction nozzle (not illustrated) that picks up an electronic component, and mounts the electronic component held by the suction nozzle on the metal wire. Supply section 84 has, for example, multiple tape feeders that feed taped electronic components one by one, and supplies the electronic components to mounting section 83. Supply section 84 is not limited to the configuration including the tape feeders, and may be a tray-type supply device that picks up an electronic component from a tray and supplies the electronic component.

For example, when base member 70 is moved to a position below mounting section 83 in accordance with movement of stage 52, mounting unit 23 moves mounting section 83 to a component supply position of supply section 84, and drives supply section 84 to supply a necessary component. Mounting section 83 picks up and holds the electronic component from a component supply position of supply section 84 by using the suction nozzle, and mounts the electronic component on the metal wire or the like shaped on base member 70.

Inspection unit 24 is a unit that inspects a structure manufactured by shaping unit 22 and mounting unit 23. Inspection unit 24 includes, for example, an imaging device such as a camera. Control device 26 may determine whether an electronic component is normally mounted based on image data captured by inspection unit 24. In addition, shaping device 10 may include a laser microscope or the like that inspects the shape of the shaped object (such as unevenness of smooth surface 93 described later).

As illustrated in FIG. 2, control device 26 includes controller 102, multiple drive circuits 104, and storage device 106. Multiple drive circuits 104 are connected to electromagnetic motors 38 and 56, holding device 62, lifting and lowering device 64, ink jet head 75, flattening device 78, irradiation device 81, heater 82, mounting section 83, supply section 84, and inspection unit 24. Controller 102 includes CPU, ROM, RAM, and the like, and is mainly a computer, and is connected to multiple drive circuits 104. Storage device 106 includes RAM, ROM, a hard disk, and the like, and stores control program 107 for performing control of shaping device 10. Controller 102 may control operations of conveyance device 20, shaping unit 22, and the like by executing control program 107 with the CPU.

Figure 14:
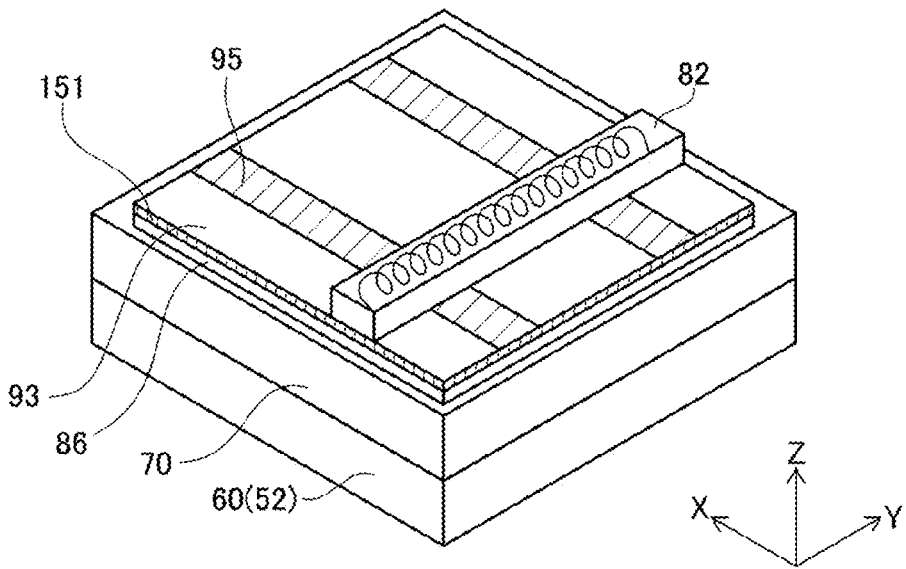
FIG. 14 is a schematic diagram illustrating a state in which a metal wire is being formed.

With the above-described configuration, shaping device 10 according to the present embodiment forms first flattening layer 86 (refer to FIG. 7) having insulating properties, smooth layer 151 (refer to FIG. 13), second flattening layer 153 (refer to FIG. 15), and metal wire 95 (refer to FIG. 14) having conductivity, by curing ultraviolet curing resin 76 and metal ink 77 as the viscous fluid. Shaping device 10 can shape a structure having a desired shape by changing the shapes of first flattening layer 86, smooth layer 151, second flattening layer 153, and metal wire 95. In shaping device 10, an electronic component may be mounted by mounting unit 23 in the process of shaping. For example, three-dimensional data of each layer obtained by slicing a structure is set in control program 107. Controller 102 forms a structure by discharging, curing, or the like viscous fluid based on data of control program 107. Controller 102 detects information such as a layer or a position where an electronic component is disposed based on the data of control program 107, and mounts the electronic component based on the detected information.

(2. Operation of Shaping Device 10)

Figure 3:
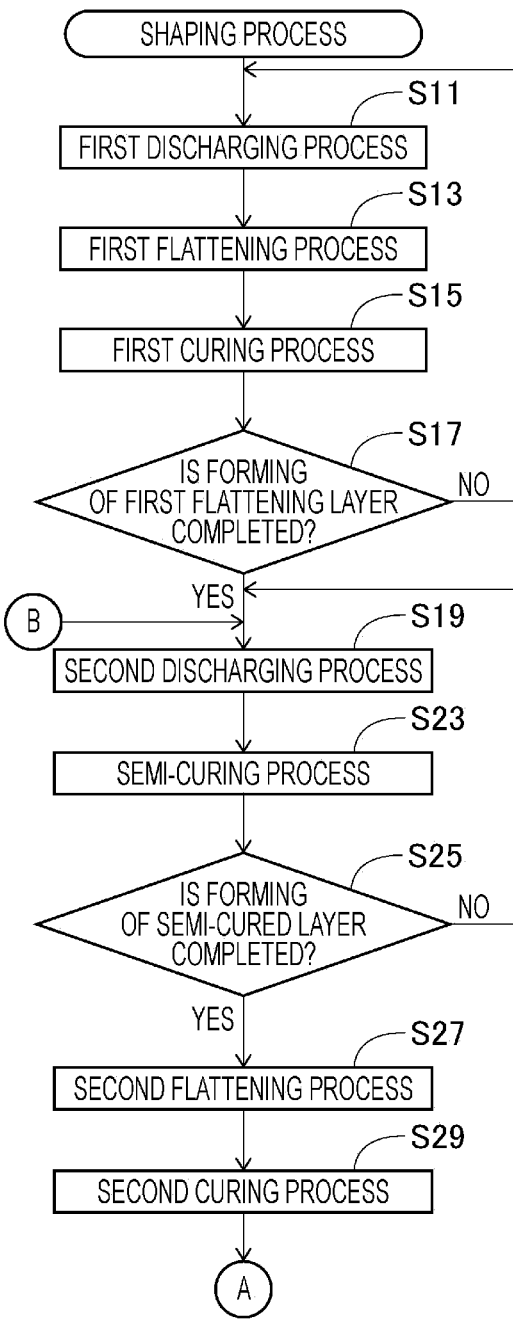
FIG. 3 is a flowchart illustrating a content of a shaping process.
Figure 4:
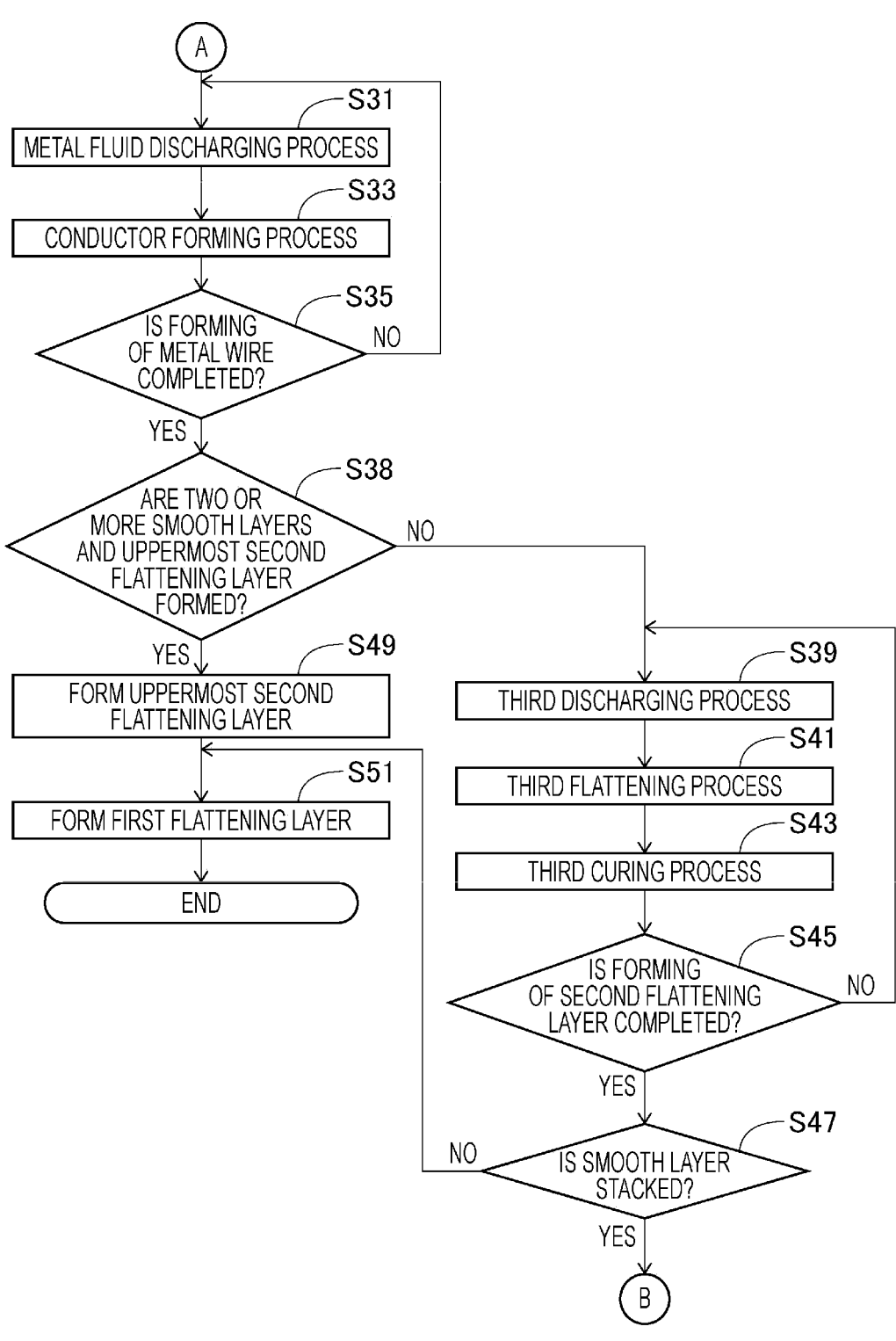
FIG. 4 is a flowchart illustrating the content of the shaping process.

Next, as an example of the operation of shaping device 10, a shaping process of shaping metal wire 95 on smooth layer 151 will be described. FIGS. 3 and 4 are flowcharts illustrating a content of the shaping process. For example, when an instruction for starting shaping is received, control device 26 executes a predetermined program in control program 107, and starts the shaping process illustrated in FIGS. 3 and 4. In the following description, the expression that controller 102 executes control program 107 to control each device may be simply referred to as a "device name". For example, the expression that "controller 102 moves base table 60" means that "controller 102 executes control program 107, controls an operation of conveyance device 20 via drive circuit 104, and moves base table 60 through an operation of conveyance device 20". FIGS. 5 to 9 and FIGS. 13 to 15 schematically illustrate each step of the shaping process. Further, the directions (the X-axis direction and the like) illustrated in FIGS. 5 to 9 and FIGS. 13 to 15 are examples.

First, base member 70 is set on base table 60 of stage 52. The setting of base member 70 may be performed by a human, or may be automatically executed by shaping device 10. Controller 102 causes conveyance device 20 to move stage 52 on which base member 70 is set to a position below shaping unit 22. In a first discharging process illustrated in S11 of FIG. 3, for example, as illustrated in FIG. 5, controller 102 moves stage 52 in the X-axis direction, and causes ink jet head 75 of printing section 72 to discharge ultraviolet curing resin 76 onto base member 70. Ink jet head 75 discharges ultraviolet curing resin 76 in a thin film form onto base member 70. Controller 102 may execute discharging using ink jet head 75 in S11, for example, by only one scan (one pass) along the X-axis direction, or may execute discharging by multiple scans.

Next, in a first flattening process in S13, controller 102 rotates roller 79 of flattening device 78 on the upper surface of ultraviolet curing resin 76 in the thin film form to perform the flattening. As indicated by an arrow in FIG. 6, controller 102 moves base member 70 (stage 52) in movement direction 133 opposite to rotation direction 131 of roller 79, and flattens ultraviolet curing resin 76 discharged in the first discharging process by roller 79. For example, controller 102 rotates roller 79 about a rotation axis parallel to the Y-axis direction in counterclockwise rotation direction 131 in FIG. 6. In addition, controller 102 moves stage 52 in movement direction 133 (direction toward the back in FIG. 6) which is a direction along the X-axis direction and is a direction opposite to rotation direction 131. The direction opposite to rotation direction 131 here is, for example, a tangential direction of roller 79 parallel to the upper surface of stage 52 and is a direction opposite to rotation direction 131. In the present embodiment, the position of roller 79 is fixed in the XYZ axis directions. Controller 102 causes lifting and lowering device 64 to lift stage 52 to a position where roller 79 comes into contact with ultraviolet curing resin 76 discharged onto base member 70, thereby performing the flattening. Controller 102 makes the rotation speed of roller 79 in rotation direction 131 larger (faster) than the movement speed of stage 52 in movement direction 133.

Roller 79 is brought into contact with ultraviolet curing resin 76 in a flowable state, transfers ultraviolet curing resin 76 to roller 79, scrapes up ultraviolet curing resin 76, and flattens the surface of ultraviolet curing resin 76 while collecting ultraviolet curing resin 76 by collection section 80. Operation directions and the like of base member 70 and roller 79 described above are examples. For example, roller 79 may be configured to be movable in the X-axis direction, and controller 102 may perform the flattening by rotating roller 79 in rotation direction 131 while moving roller 79 in movement direction 133 or the direction opposite to movement direction 133.

Figure 7:
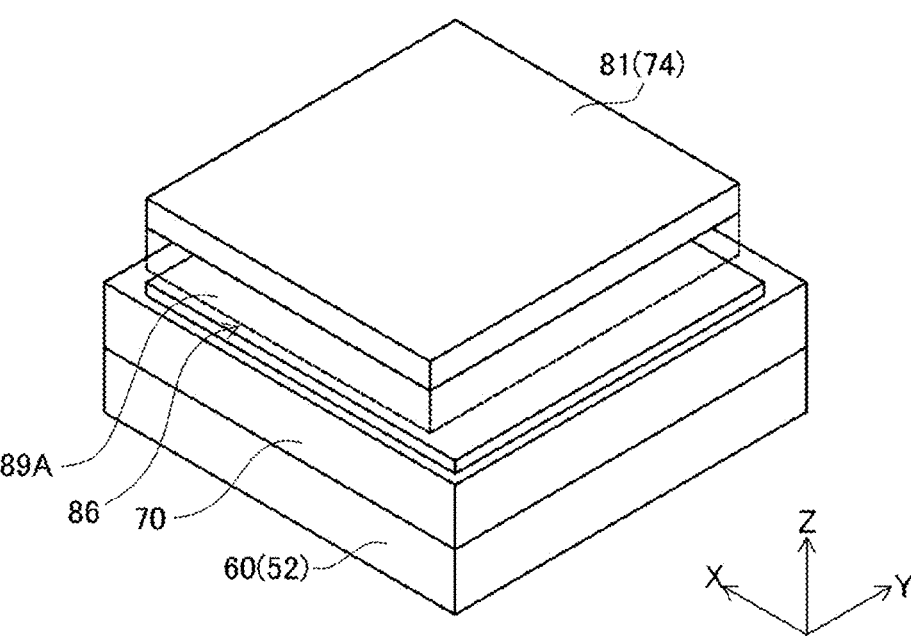
FIG. 7 is a schematic diagram illustrating a state in which the flattened ultraviolet curing resin is being cured by a curing section to form a first flattening layer.

Next, in a first curing process in S15, controller 102 irradiates the flattened ultraviolet curing resin 76 with ultraviolet rays by irradiation device 81. As illustrated in FIG. 7, irradiation device 81 cures ultraviolet curing resin 76 by irradiating ultraviolet curing resin 76 (refer to FIG. 6) spread in a thin film form with ultraviolet rays to form first flattening layer 86 having insulating property. Thus, first flattening layer 86 having flattened first flattening surface 86A on the surface is formed.

Next, controller 102 determines whether first flattening layer 86 having a predetermined thickness has been formed (S17). Controller 102 performs a negative determination in S17, for example, until a thickness having a set value of control program 107 or a value designated by an operation input from the outside is reached (S17: NO). Controller 102 can determine the thickness of formed first flattening layer 86 based on, for example, the size of the liquid droplet of ultraviolet curing resin 76 discharged from ink jet head 75, the number of times S11 to S15 being repeatedly executed, and the like. Controller 102 stacks the insulating layers by repeatedly performing the processes of S11 to S15, and forms first flattening layer 86 having first flattening surface 86A on the surface and a predetermined thickness. Controller 102 does not have to execute the first flattening process in S13 each time S11 is executed. For example, controller 102 may execute the first flattening process in S13 each time S11 and S15 are executed multiple times.

Figure 8:
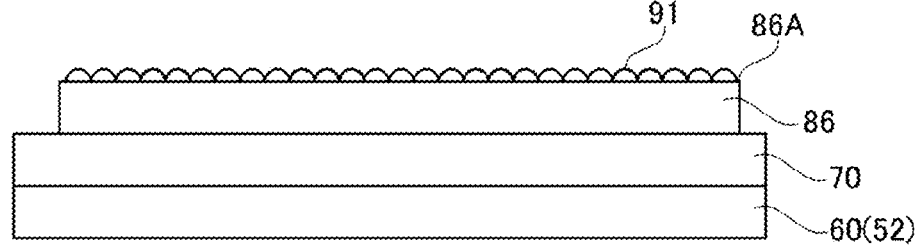
FIG. 8 is a schematic diagram illustrating the first flattening layer whose surface is flattened.

When controller 102 determines in S17 that first flattening layer 86 having a predetermined thickness has been formed (S17: YES), in a second discharging process in S19, in order to smooth first flattening surface 86A of first flattening layer 86, controller 102 discharges ultraviolet curing resin 76 onto first flattening surface 86A. Here, by repeatedly performing S11 to S15, flattened first flattening surface 86A can be formed on the surface of first flattening layer 86. FIG. 8 schematically illustrates first flattening layer 86 whose surface is flattened. As illustrated in FIG. 8, fine unevenness 91 is formed on first flattening surface 86A of flattened first flattening layer 86 due to, for example, a difference in an amount of ultraviolet curing resin 76 discharged from the nozzles of ink jet head 75, a size of liquid droplets of ultraviolet curing resin 76, or the like. A height of unevenness 91 may be, for example, $\pm 10\,\mu m$, and is extremely small compared with a size of roller 79. Therefore, even when first flattening surface 86A of first flattening layer 86 is flattened by roller 79, it is difficult to flatten first flattening surface 86A to the extent of fine unevenness 91. In the present disclosure, the surface on which fine unevenness 91 is formed is defined as a flattening surface. A surface on which fine unevenness 91 is reduced, or the unevenness of the surface is equal to or less than $\pm 1\,\mu m$ (it can be assumed that original unevenness 91 is eliminated) is defined as a smooth surface that is smoothed.

When unevenness 91 is formed on first flattening surface 86A, in a case where a metal wire is formed on first flattening surface 86A, a thickness of the metal wire to be formed varies. Alternatively, there is concern that the conductivity of the metal wire may be reduced by not completely baking the metal wire in a portion having a large thickness (metal fine particles do not contact or fuse). As a result, a resistance value of the metal wire becomes uniform, and thus it is difficult to obtain a desired high frequency characteristic.

Then, controller 102 performs smoothing to reduce or eliminate unevenness 91 by discharging ultraviolet curing resin 76 again to first flattening surface 86A of flattened first flattening layer 86. In the second discharging process of S19 of FIG. 3, controller 102 discharges ultraviolet curing resin 76 to first flattening surface 86A by ink jet head 75. In the following description, in a case where ultraviolet curing resin 76 in the first discharging process in S11 is differentiated from ultraviolet curing resin 76 in the second discharging process in S19, ultraviolet curing resin 76 in S19 will be referred to as second ultraviolet curing resin 76A. Controller 102 sets a discharging amount of second ultraviolet curing resin 76A in S19 to an amount corresponding to the size of unevenness 91. For example, when the height of formed unevenness 91 is large (a groove is deep), controller 102 executes a process for increasing a discharging amount of ink jet head 75. Controller 102 may discharge second ultraviolet curing resin 76A in a constant discharging amount regardless of the size of unevenness 91.

Next, controller 102 performs a semi-curing process on second ultraviolet curing resin 76A discharged in S19 (S23). Controller 102 semi-cures second ultraviolet curing resin 76A by irradiating second ultraviolet curing resin 76A with ultraviolet rays from irradiation device 81 (refer to FIG. 7). The semi-cured state referred to herein is a state in which viscosity is reduced and the fluidity is improved, and is not completely stable at the physical property level. The semi-cured state is, for example, a state in which, when new second ultraviolet curing resin 76A is discharged onto the layer of semi-cured second ultraviolet curing resin 76A, discharged second ultraviolet curing resin 76A is not mixed with the layer and is cured to the extent of being placed (stacked) on the layer in the semi-cured state. For example, controller 102 semi-cures second ultraviolet curing resin 76A by reducing the intensity of the ultraviolet ray (the intensity of the light) with which second ultraviolet curing resin 76A is irradiated, the scanning speed at which the ultraviolet ray is scanned, the number of scans, the irradiation time, the number of irradiations, and the like as compared with the normal curing process (the first curing process in S15 or the like).

Figure 9:
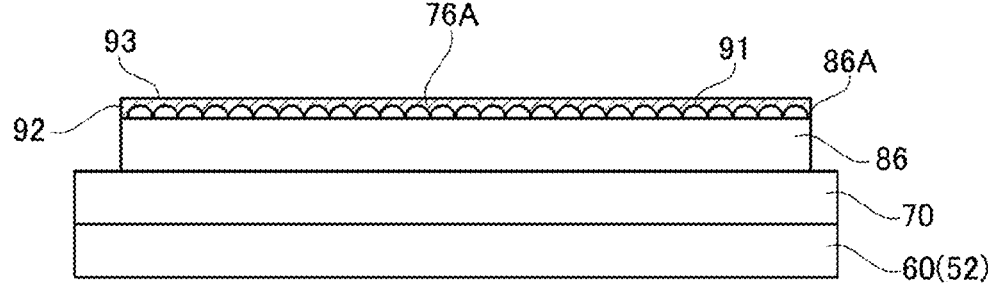
FIG. 9 is a schematic diagram illustrating a semi-cured layer whose surface is smoothed.

Controller 102 repeatedly executes the processes of S19 to S23 until the semi-cured layer having the predetermined thickness is formed (S25: NO), and stacks second ultraviolet curing resin 76A in the semi-cured state, as in S17 described above. As illustrated in FIG. 9, semi-cured layer 92 is formed on first flattening layer 86 by stacking semi-cured second ultraviolet curing resin 76A. Semi-cured second ultraviolet curing resin 76A spreads over fine unevenness 91 of first flattening surface 86A and is smoothed by a leveling effect, and forms smooth surface 93. The leveling effect as described herein is a phenomenon in which a surface area of a liquid is as small as possible by the surface tension. Although depending on the viscosity of a liquid, a thin film made of second ultraviolet curing resin 76A changes in thickness to be flattened (more uniform) over time. Second ultraviolet curing resin 76A is applied and spread by being discharged onto first flattening surface 86A to fill unevenness 91.

Figure 10:
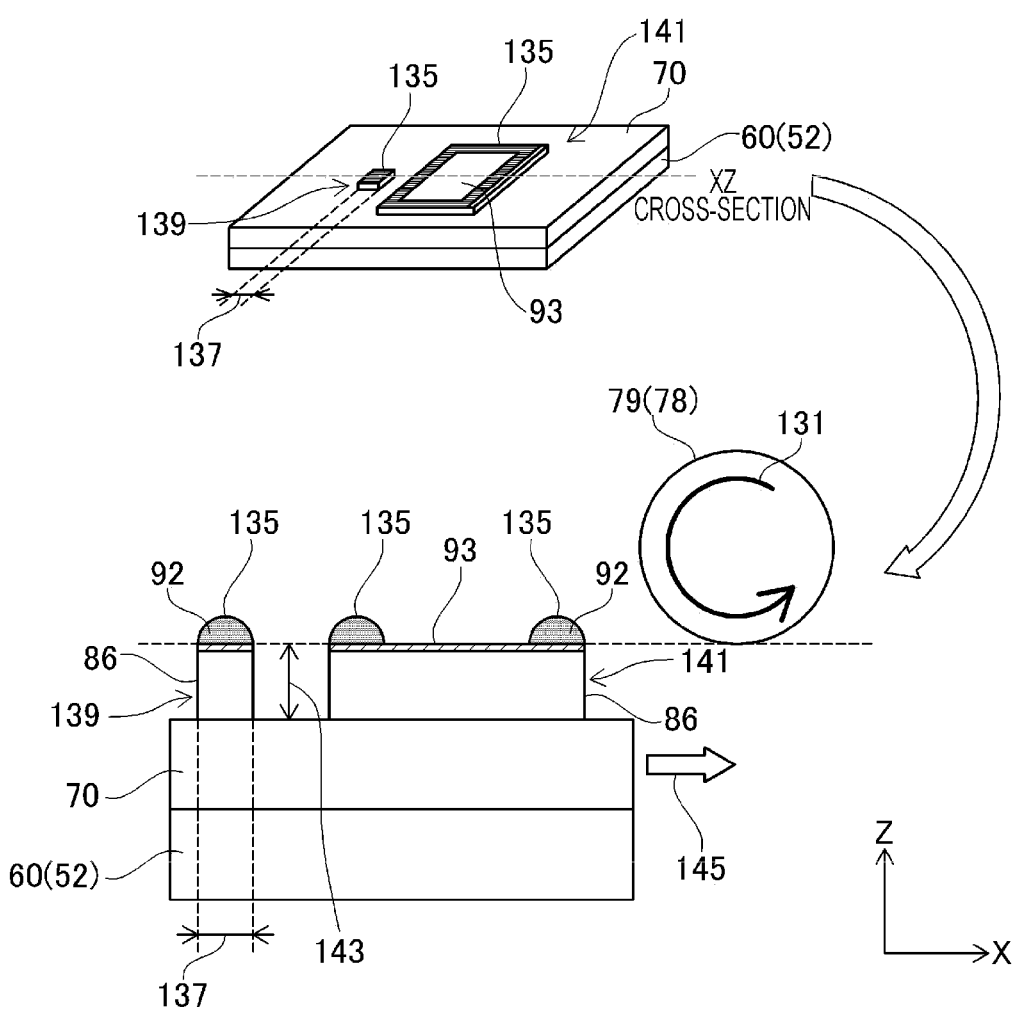
FIG. 10 is a schematic diagram illustrating a raised portion.

After forming semi-cured layer 92 having a predetermined thickness (S25: YES), controller 102 executes the second flattening process (S27). Here, when forming semi-cured layer 92 in S19 to S25 or when performing curing thereafter, a locally raised portion is formed by the surface tension of second ultraviolet curing resin 76A. Specifically, FIG. 10 is a schematic diagram illustrating raised portion 135. As illustrated in FIG. 10, for example, in a case where shaped object 139 having a small width in which width 137 in the X-axis direction is several mm or less is shaped, raised portion 135 bulging upward in the Z-axis direction due to the surface tension of second ultraviolet curing resin 76A is formed in semi-cured layer 92. In addition, for example, in a case where shaped object 141 in which the width in the X-axis direction or the Y-axis direction is widened to a certain width (for example, 3 mm) or more is shaped, raised portion 135 bulging upward is formed at an end portion of shaped object 141 in the X-axis direction or the Y-axis direction. In each of shaped objects 139 and 141, raised portion 135 protruding beyond predetermined height 143 is formed. Predetermined height 143 is, for example, a target height defined by three-dimensional data of control program 107 or the like, and is a height forming smooth surface 93.

In addition, in a case where the shaping is further continued on semi-cured layer 92, for example, a force of adhering to a base (raised portion 135) due to the surface tension becomes stronger in the ultraviolet curing resin discharged onto raised portion 135 than in the ultraviolet curing resin printed on the flat surface such as smooth surface 93. Therefore, when the same discharging amount of ultraviolet curing resin is discharged onto raised portion 135 and smooth surface 93 and the flattening process is executed under the same conditions, raised portion 135 remains on the shaped object. As a result, the thickness and the shaping accuracy of the completed shaped object deteriorate. In addition, in the flattening process, raised portion 135 and roller 79 may come into contact with each other, and a part of the shaped object may be broken, or the shaved pieces of the shaped object may be collected by collection section 80.

Then, controller 102 executes the second flattening process of S27 to reduce the size of raised portion 135 (suppress the increase). Controller 102 moves stage 52 to the position of flattening device 78, and adjusts the height of stage 52 so that a lower end of roller 79 is disposed at the position of smooth surface 93, that is, predetermined height 143 as illustrated in FIG. 10. As described above, in the present embodiment, the position of roller 79 in the X-axis direction or the Y-axis direction is fixed. Then, the flattening by roller 79 is executed by adjusting the position at which roller 79 rotating in a state where this position is fixed comes into contact with semi-cured layer 92 to the position of the upper surface (smooth surface 93) of semi-cured layer 92 in the design data. As a result, it is possible to transfer and collect second ultraviolet curing resin 76A included in raised portion 135 protruding from smooth surface 93 onto roller 79 and reduce the size of raised portion 135 to perform the flattening. The second flattening process may be performed while moving roller 79 without fixing the position of roller 79. Roller 79 may be positioned slightly above or below smooth surface 93.

The method of aligning the position of roller 79 with the position of the upper surface of semi-cured layer 92 is not particularly limited. The position of the lower end of roller 79 may be adjusted to the target height for shaping smooth surface 93 based on the three-dimensional data of control program 107. Alternatively, the shaped object may be experimentally shaped, the height of the upper surface of semi-cured layer 92 may be measured, and the position of roller 79 may be adjusted. Alternatively, the position of roller 79 may be adjusted by measuring the height of the upper surface of semi-cured layer 92 shaped by a sensor or the like before executing S27 in the actual shaping process. The position of stage 52 may be fixed, the position of roller 79 in the Z-axis direction may be adjusted, and the position of roller 79 may be aligned with the position of the upper surface of semi-cured layer 92. Both stage 52 and roller 79 may be moved in the Z-axis direction for adjustment.

Figure 11:
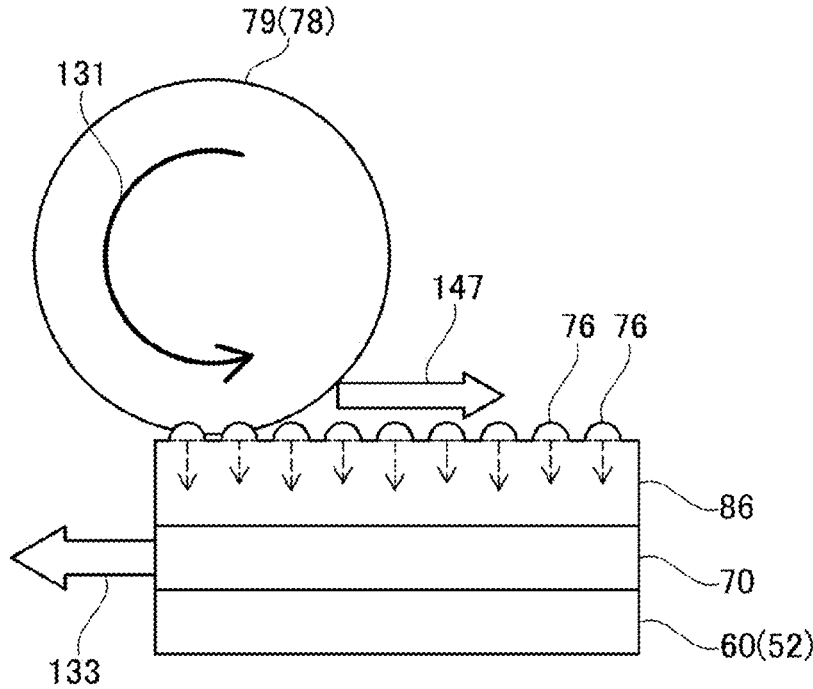
FIG. 11 is a schematic diagram of a first flattening process.

Further, unlike the first flattening process of S13, as illustrated in FIG. 9, controller 102 moves stage 52 in movement direction 145 which is the same direction as rotation direction 131 of roller 79, and flattens semi-cured layer 92 by roller 79. Here, the same direction as rotation direction 131 is, for example, a tangential direction of roller 79 parallel to the upper surface of stage 52 and the same direction as rotation direction 131. Since the position of roller 79 is fixed as described above, roller 79 rotates in a state where the position in movement direction 145 of stage 52, for example, the X-axis direction is fixed. FIG. 11 is a schematic diagram of the first flattening process. In the first flattening process of S13, for example, the flattening is executed after one first discharging process (S11). For this reason, one liquid droplet is smaller in ultraviolet curing resin 76 which is a target of the first flattening process than in a state in which second ultraviolet curing resin 76A in the semi-cured state is stacked in many layers as in the second flattening process. In ultraviolet curing resin 76, an intermolecular force between the liquid droplets themselves and between the liquid droplet and the cured film (the already cured portion of first flattening layer 86) is weak (refer to the arrow in FIG. 11). In such a case, rotation direction 131 and movement direction 133 are set to opposite directions, and a force is applied from roller 79 to ultraviolet curing resin 76 in the direction of arrow 147 illustrated in FIG. 11, so that the excess amount of ultraviolet curing resin 76 is transferred to roller 79 and can be quickly and efficiently flattened. As a result, a shaping time can be shortened.

Figure 12:
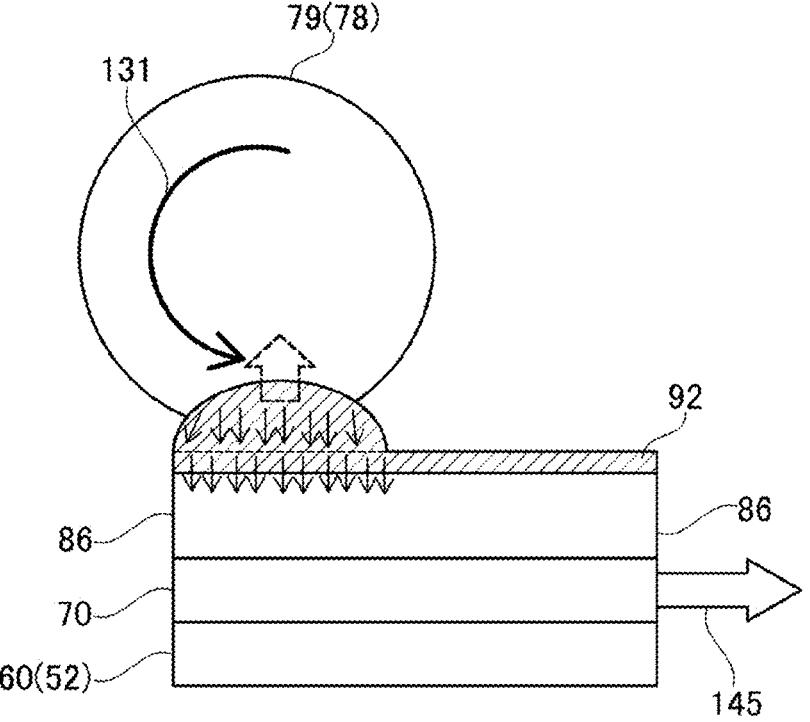
FIG. 12 is a schematic diagram of a second flattening process.

Meanwhile, FIG. 12 is a schematic diagram of the second flattening process. In the second flattening process of S27, for example, the cycle of S19 to S23 is executed multiple times in order to fill unevenness 91, and second ultraviolet curing resin 76A in the semi-cured state is stacked. For this reason, even when the transfer and collection are performed quickly as in the first flattening process, the liquid film formed by the liquid droplets of second ultraviolet curing resin 76A is large, and the intermolecular force between the liquid droplets themselves or the liquid droplets and first flattening layer 86 is strong (refer to an arrow in FIG. 12). Therefore, when the flattening is performed by setting movement direction 133 and rotation direction 131 to be opposite to each other as in the first flattening process, there is a concern that second ultraviolet curing resin 76A cannot be sufficiently collected (transferred). Here, by setting rotation direction 131 of roller 79 and movement direction 145 of stage 52 to the same direction, it is possible to increase the time for which second ultraviolet curing resin 76A moves to the surface of roller 79, that is, the time for which second ultraviolet curing resin 76A is transferred, and it is possible to more reliably transfer and collect excess second ultraviolet curing resin 76A to roller 79 and perform the flattening. Raised portion 135 can be made smaller more reliably.

Further, as described above, in the first flattening process, controller 102 makes the rotation speed of roller 79 in rotation direction 131 larger (faster) than the movement speed of stage 52 in movement direction 133. For example, controller 102 sets the rotation speed of roller 79 to several times the movement speed of stage 52. Accordingly, in the first flattening process in which the intermolecular force is weaker than that in the second flattening process and the liquid droplets are easily transferred, roller 79 is rotated at a high speed, the transfer amount to roller 79 per other unit time is increased, and the time required for the first flattening process can be shortened. As a result, the shaping time can be shortened.

In the second flattening process, controller 102 sets the movement speed of stage 52 in movement direction 145 to be equal to the rotation speed of roller 79 in rotation direction 131. Accordingly, the difference in the relative movement speed between roller 79 and second ultraviolet curing resin 76A on stage 52 is eliminated, and roller 79 can be brought into a state as if roller 79 suppresses second ultraviolet curing resin 76A from above. In the second flattening process in which the intermolecular force is strong and the transfer of the liquid droplets is difficult compared to the first flattening process, it is possible to more reliably transfer excess second ultraviolet curing resin 76A to roller 79 by eliminating the relative movement of roller 79 and second ultraviolet curing resin 76A.

After executing S27, controller 102 executes a second curing process of curing semi-cured layer 92 (S29). Controller 102 moves stage 52 to irradiation device 81, and irradiates semi-cured layer 92 on which the second flattening process has been performed with ultraviolet rays. Second ultraviolet curing resin 76A is irradiated with ultraviolet rays to increase the viscosity, and thus, second ultraviolet curing resin 76A is cured to fill unevenness 91. Smooth layer 151 obtained by curing semi-cured layer 92 is formed on first flattening layer 86 (refer to FIG. 13). Smooth surface 93 formed on the upper surface of smooth layer 151 is a surface in which unevenness 91 is reduced or eliminated by the leveling effect described above. Further, smooth surface 93 becomes a surface in which raised portion 135 is smaller or eliminated than that in the second flattening process.

Next, controller 102 forms a metal wire at a predetermined position on smooth surface 93 based on three-dimensional data of control program 107. Specifically, in the metal fluid discharging process of S31 of FIG. 4, controller 102 causes ink jet head 75 to discharge metal ink 77 in a thin film shape onto smooth surface 93 of smooth layer 151 (refer to FIG. 13). In a conductor forming process in S33, controller 102 causes heater 82 to heat and bake metal ink 77 discharged onto smooth surface 93 (refer to FIG. 14). In S35, controller 102 determines whether metal wire 95 having a desired thickness or shape has been formed. For example, controller 102 performs a negative determination in S35 up to the number of times set in advance (S35: NO), and repeatedly executes S31 and S33 to form desired metal wire 95 on smooth surface 93. Desired metal wire 95 described herein is metal wire 95 that satisfies a required thickness, shape, position, or electrical characteristics. When S31 and S33 are repeatedly executed up to the number of times set in advance, controller 102 performs an affirmative determination in S35 (S35: YES), and executes S38. Consequently, it is possible to shape first flattening layer 86 (wiring board) in which metal wire 95 is formed on smooth surface 93.

Here, when metal ink 77 is discharged and cured on first flattening surface 86A on which unevenness 91 is formed to form metal wire 95, a thickness of metal wire 95 is made nonuniform due to unevenness 91. There is concern that failures such as an increase in a resistance value of metal wire 95, disconnection, and deterioration of high frequency characteristic may occur. In contrast, in shaping device 10 of the present embodiment, metal wire 95 having a more uniform thickness can be formed by reducing fine unevenness 91 of first flattening surface 86A or raised portion 135, discharging metal ink 77 onto reduced smooth surface 93, and the like. As a result, the resistance value of metal wire 95 can be reduced to a desired value, and thus the occurrence of disconnection can be suppressed.

Next, controller 102 determines whether to form two or more smooth layers 151 and to form uppermost second flattening layer 153A (refer to FIG. 16) to be described later (S38). At this time, since only one smooth layer 151 is formed, controller 102 makes a negative determination (S38: NO) and executes S39. A case where multiple smooth layers 151 are formed and details of uppermost second flattening layer 153A will be described later.

Next, a third discharging process (S39) and a third flattening process (S41) are executed. In a case where raised portion 135 remains not to be completely flattened by the flattening process of S27 described above, when the shaping is further continued on smooth layer 151 having raised portion 135, the shape of raised portion 135 may remain in the shaping of the upper layer. This is because, as described above, the force with which the ultraviolet curing resin discharged to raised portion 135 adheres to raised portion 135 (base) due to the surface tension is stronger than the ultraviolet curing resin printed on the flat surface such as smooth surface 93.

In this case, controller 102 discharges ultraviolet curing resin 76 onto smooth layer 151, and executes the third flattening process according to the height of raised portion 135. More specifically, in S39, the controller causes ink jet head 75 to discharge ultraviolet curing resin 76 onto smooth surface 93. In the following description, in a case where ultraviolet curing resin 76 in the first discharging process in S11 is differentiated from ultraviolet curing resin 76 in the third discharging process in S39, ultraviolet curing resin 76 in S39 will be referred to as third ultraviolet curing resin 76B. In addition, the order and the contents of the processes illustrated in FIGS. 3 and 4 are examples, and for example, in a case where the shaping of metal wire 95 is further performed at another position of smooth surface 93 after executing S35, the processes of S31 to S35 may be repeatedly performed.

Next, in the third flattening process of S41, controller 102 flattens discharged third ultraviolet curing resin 76B with roller 79. After the flattening in S41, controller 102 causes irradiation device 81 to irradiate flattened third ultraviolet curing resin 76B with ultraviolet rays to form a thin insulating layer (S43). Next, controller 102 determines whether second flattening layer 153 having a predetermined thickness set by control program 107 or the like has been formed (S45). Controller 102 repeatedly executes S39, S41, and S43 until second flattening layer 153 having a predetermined thickness can be formed (S45: NO) to stack the insulating layers, thereby forming second flattening layer 153 having a predetermined thickness. Controller 102 does not have to execute the third flattening process in S41 each time S39 is executed.

Figure 15:
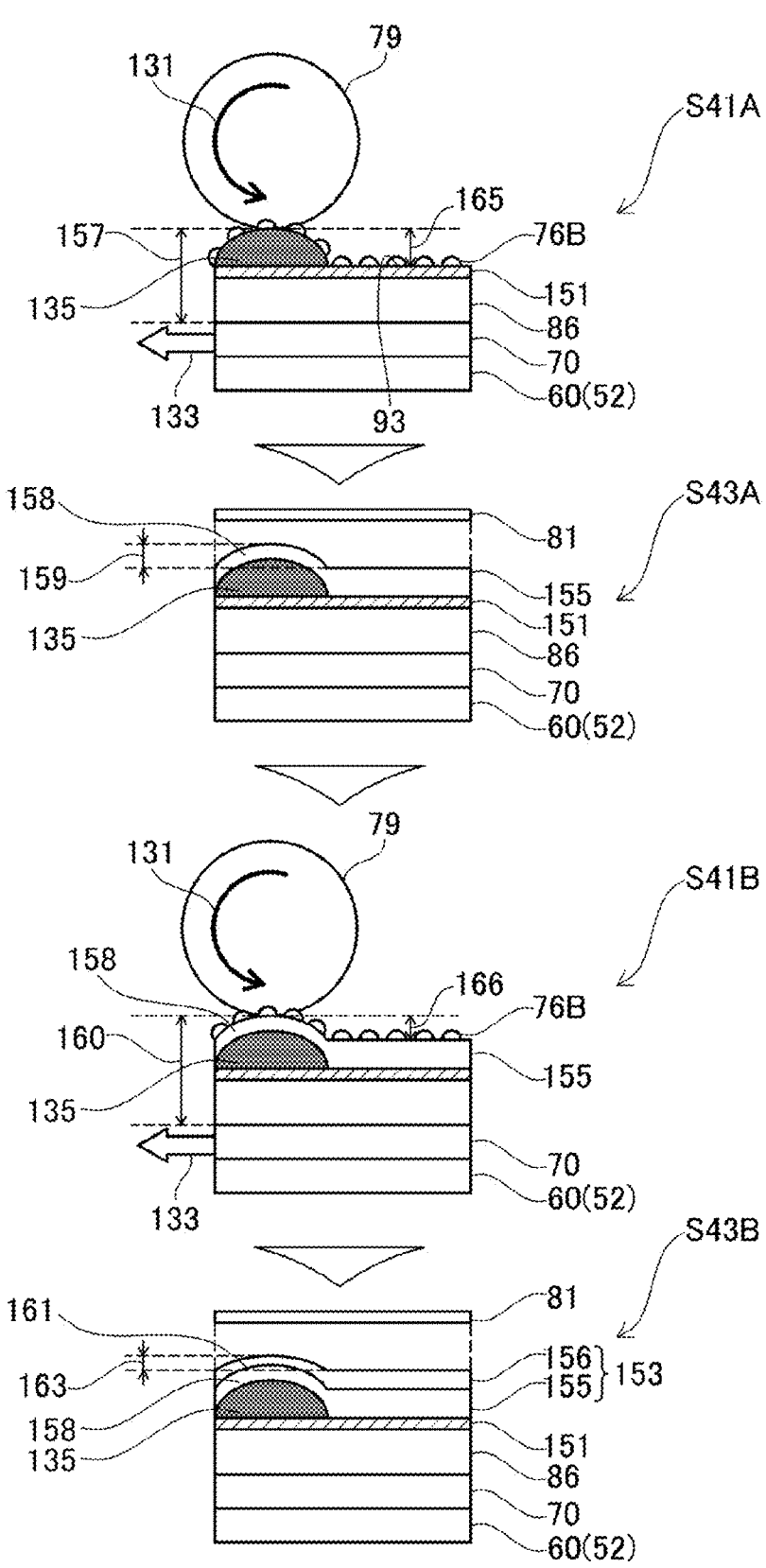
FIG. 15 is a schematic diagram illustrating states of a third flattening process and a third curing process.

FIG. 15 illustrates a state where first layer 155 and second layer 156 included in second flattening layer 153 are formed. In FIG. 15, metal wire 95 is not illustrated. First layer 155 is the lowermost layer among the multiple insulating layers included in second flattening layer 153. Second layer 156 is an insulating layer one layer above first layer 155. That is, first layer 155 is an insulating layer formed in the first cycle of S39, S41, and S43, and second layer 156 is an insulating layer formed in the second cycle.

In S41, controller 102 provides roller 79 at a height corresponding to the height of raised portion 135 formed in smooth layer 151, and increases the number of scans of the flattening by roller 79 to be larger than that in the first flattening process in S13. Raised portion 135 formed in smooth layer 151 here is raised portion 135 formed (remaining) even after the second flattening process of S27 is performed. Controller 102 uses, as the height corresponding to the height of raised portion 135, height 157 (refer to the uppermost diagram of FIG. 15) at which roller 79 is not in contact with raised portion 135 formed in smooth layer 151 and roller 79 is in contact with third ultraviolet curing resin 76B discharged onto raised portion 135 in the third discharging process of S39.

S41A and S43A in FIG. 15 respectively indicate a first instance of the third flattening process and a first instance of the third curing process, and S41B and S43B respectively indicate a second instance of the third flattening process and a second instance of the third curing process. In S41A, controller 102 adjusts the height of stage 52 and provides roller 79 at a position where roller 79 is not in contact with raised portion 135 of smooth layer 151 and is in contact with third ultraviolet curing resin 76B discharged in a first instance of the third discharging process, that is, discharged onto raised portion 135. Accordingly, it is possible to avoid interference between roller 79 and raised portion 135 and to suppress occurrence of breakage or the like of the shaped object. A part or the whole of third ultraviolet curing resin 76B discharged onto raised portion 135 is collected by roller 79 or stacked on smooth surface 93 recessed from raised portion 135. As a result, it is possible to stack a larger amount of third ultraviolet curing resin 76B on smooth surface 93 than raised portion 135. After executing the third flattening process of S41A, controller 102 executes the third curing process of S43A. Accordingly, for cured first layer 155, assuming that third ultraviolet curing resin 76B is temporarily stacked on raised portion 135, protruding portion 158 that is more elevated than the remaining portions is formed on raised portion 135. However, height difference 159 between the apex of protruding portion 158 and the remaining portions can be made smaller than that in a case where the height of roller 79 is not adjusted (for example, a case where the lower end of roller 79 is aligned with the position of smooth surface 93 or the like). That is, the elevation due to raised portion 135 can be suppressed by the upper layer, and the influence of raised portion 135 on the shape of the upper layer can be reduced. Preferably, first layer 155 is flattened at the height of the apex of raised portion 135. That is, first layer 155 preferably has a flat surface on which protruding portion 158 is not formed.

When the elevated portion due to raised portion 135 cannot be flattened by performing only one cycle of the processes of S39 to S43, it is effective to perform multiple cycles. When shaping second layer 156 in the next cycle, controller 102 adjusts the height of stage 52 and provides roller 79 at a height corresponding to the height of raised portion 135 in the third flattening process (S41B). Controller 102 provides roller 79 at height 160 at which roller 79 does not come into contact with protruding portion 158 stacked on raised portion 135 and roller 79 comes into contact with third ultraviolet curing resin 76B discharged onto protruding portion 158 to perform the flattening. Accordingly, second layer 156 cured in S43B preferably has a flat surface formed as an upper surface. Alternatively, height difference 163 between the apex of elevated protruding portion 161 stacked on protruding portion 158 and the remaining portions of second layer 156 is further reduced. That is, the elevation can be further reduced.

The method of providing roller 79 at a height corresponding to the height of raised portion 135 or protruding portion 158 is not particularly limited. Controller 102 may adjust the height of stage 52 based on a set value set in advance in control program 107. The height of stage 52 (roller 79) may be determined by experimentally shaping the shaped object and measuring the heights of raised portion 135 and protruding portions 158 and 161. Alternatively, before performing S41 in the actual shaping process, the height of roller 79 may be adjusted by measuring the height of raised portion 135 or protruding portion 158 shaped by a sensor or the like. The position of stage 52 may be fixed, and the position of roller 79 in the Z-axis direction may be adjusted to adjust the position of roller 79, or both stage 52 and roller 79 may be moved in the Z-axis direction to adjust the position.

Further, in the third flattening process (S41A) of forming first layer 155, controller 102 executes the flattening by setting the distance between smooth surface 93 (upper surface) of smooth layer 151 and roller 79 in the Z-axis direction as first distance 165. In the third flattening process (S41B) of forming second layer 156 in the next cycle, controller 102 executes the flattening by setting the distance between the upper surface of first layer 155 and roller 79 in the Z-axis direction as second distance 166. Controller 102 makes second distance 166 shorter than first distance 165. This is because, as described above, by repeatedly executing the third discharging process, the third flattening process, and the third curing process, height differences 159 and 163 described above can be gradually reduced, and roller 79 can be gradually brought close to the upper surface (flat surface excluding protruding portions 158 and 161) of the shaped object. Accordingly, the difference between second distance 166 and first distance 165 is preferably a difference between the distance between the apex of raised portion 135 and smooth surface 93 and the distance between the upper surface of first layer 155 and the apex of protruding portion 158. That is, it is possible to bring roller 79 closer to the flat surface (upper surface) by the distance by which the elevation of raised portion 135 can be suppressed by the shaping of first layer 155. By setting second distance 166 to be shorter than first distance 165, roller 79 can be brought closer to protruding portion 158 to effectively perform flattening.

Further, in a case where the cycle of S39, S41, and S43 is performed multiple times, controller 102 may gradually shorten the distance between the upper surface of the insulating layer cured in the previous cycle and roller 79 as the cycle proceeds, that is, toward the upper layers. That is, when first layer 155, second layer 156, the third layer (not illustrated), . . . are stacked, the distance between the upper surface of each layer and roller 79 may be gradually shortened. Accordingly, roller 79 is relatively brought close to the upper surface of the shaped object as height differences 159 and 163 become smaller, and protruding portions 158 and 161 can be more flattened.

Further, controller 102 increases the number of scans of roller 79 in the third flattening process to be larger than that in the first flattening process of S13. Here, as illustrated in FIG. 11, in the first flattening process, the surface on which raised portion 135 is not formed is flattened by discharging ultraviolet curing resin 76. For this reason, liquid droplets of ultraviolet curing resin 76 are present on a flat base, and for example, excess liquid droplets can be transferred to roller 79 by being scraped by a squeegee. Therefore, it is easy to transfer ultraviolet curing resin 76 to roller 79.

Meanwhile, in the third flattening process, as illustrated in S41A and S41B of FIG. 15, for example, there is a liquid droplet of third ultraviolet curing resin 76B on raised portion 135 or protruding portion 158 of the curved surface shape, and the liquid droplet cannot be collected by roller 79 as if a flat surface is scraped by a squeegee. Further, due to the curved surface shape, the contact time between the liquid droplet on raised portion 135 or protruding portion 158 and roller 79 is short, and there is a concern that the transfer may become difficult by one scan. Then, controller 102 increases the number of scans of the third flattening process. For example, when the operation of moving stage 52 once in the X-axis direction with respect to roller 79 is one scan, controller 102 multiplies the number of scans in S41 by several times as compared with the number of scans in S13. As a result, it is possible to increase the time for transferring the liquid droplets to roller 79 by increasing the number of scans, and to more reliably collect the liquid droplets on raised portion 135 and protruding portions 158 and 161. As a result, it is possible to suppress an increase in protruding portions 158 and 161 to be stacked, and as a result, it is possible to achieve further the flattening.

Similarly to the first flattening process of S13, in the third flattening process of S41, controller 102 moves stage 52 in the direction opposite to rotation direction 131 of roller 79 to perform the flattening (refer to FIG. 15). Accordingly, similarly to the first flattening process, a force is applied from roller 79 to ultraviolet curing resin 76 in the direction of arrow 147 illustrated in FIG. 11, and the excess amount of ultraviolet curing resin 76 is transferred to roller 79 and can be quickly and efficiently flattened.

Similarly to the first flattening process, in the third flattening process of S41, controller 102 increases the rotation speed of the roller compared to the movement speed of stage 52. For example, controller 102 sets the rotation speed of roller 79 to several times the movement speed of stage 52. Accordingly, in the third flattening process in which the intermolecular force is weaker than that in the second flattening process and the liquid droplets are easily transferred, roller 79 is rotated at a high speed, the transfer amount to roller 79 per other unit time is increased, and the time required for the third flattening process can be shortened. As a result, the shaping time can be shortened.

Next, when controller 102 determines in S45 that the formation of second flattening layer 153 having a predetermined thickness is completed (S45: YES), controller 102 determines whether to further stack smooth layer 151 or whether multiple smooth layers 151 are already stacked (S47). When smooth layer 151 or metal wire 95 is further formed on second flattening layer 153, or when two or more smooth layers 151 are already formed (S47: YES), controller 102 executes S19, and executes shaping of smooth layer 151, shaping of metal wire 95, and the like. Meanwhile, when only one smooth layer 151 is formed and multiple smooth layers 151 are not formed (S47: NO), controller 102 forms first flattening layer 86 on second flattening layer 153 (S51) and ends the shaping.

When two or more smooth layers 151 are stacked, controller 102 determines whether to form uppermost second flattening layer 153A (refer to FIG. 16), which is another condition, in S38 since two or more smooth layers 151 are formed and the first condition of S38 is satisfied. Uppermost second flattening layer 153A is a layer formed as the uppermost second flattening layer 153 when multiple combinations of smooth layer 151 and second flattening layer 153 are stacked. When controller 102 does not form uppermost second flattening layer 153A, that is, when the formation of second flattening layer 153 and smooth layer 151 is continued (S38: NO), controller 102 executes S39 and the subsequent steps. Accordingly, it is possible to perform the flattening by performing S39 to S45 on raised portion 135 formed by the second and subsequent shaping of smooth layer 151.

Figure 16:
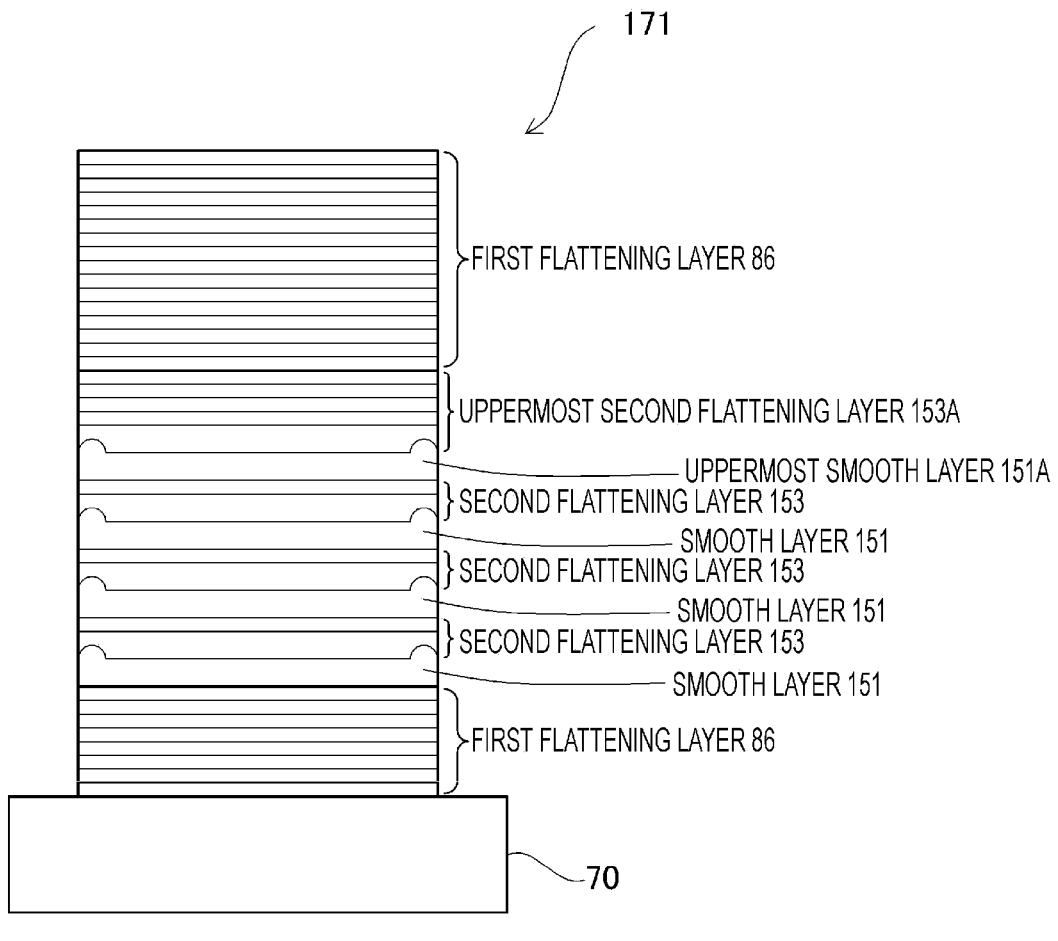
FIG. 16 is a schematic diagram of a shaped object.

Controller 102 repeatedly executes S19 to S35 and S39 to S45 to repeatedly form and stack smooth layer 151 and second flattening layer 153. FIG. 16 illustrates shaped object 171 in which four layers of second flattening layer 153 (including uppermost second flattening layer 153A) and smooth layer 151 are stacked as an example of the completed shaped object. In FIG. 16, metal wire 95 is not illustrated. When an affirmative determination is made in S47 (S47: YES) and S19 to S45 are repeatedly executed, as illustrated in FIG. 16, controller 102 shapes shaped object 171 in which smooth layer 151 and second flattening layer 153 are alternately formed and stacked. Although the increase of raised portion 135 and protruding portions 158 and 161 is suppressed by the third flattening process (S41), in a case where second flattening layer 153 does not become a perfect flat surface and fine protruding portions 158 and 161 remain on second flattening layer 153, there is a possibility that protruding portions 158 and 161 are accumulated and stacked. In the shaping of uppermost second flattening layer 153A after two or more smooth layers 151 are stacked, controller 102 shapes uppermost second flattening layer 153A thicker than second flattening layer 153 of the lower layer, and flattens the accumulated bulges of protruding portions 158 and 161.

After smooth layer 151 and second flattening layer 153 are alternately formed and stacked, when controller 102 reaches the stage of forming uppermost second flattening layer 153A, controller 102 makes an affirmative determination in S38 (S38: YES) and forms uppermost second flattening layer 153A (S49). In the processes of S19 to S29 before performing S49, uppermost smooth layer 151A of the uppermost layer illustrated in FIG. 16 is formed. In S49, controller 102 forms the flattening layer by repeatedly executing the same process as the formation of second flattening layer 153 (the same process as S39, S41, and S43). In addition, controller 102 increases the number of times of repeating S39, S41, and S43 to be larger than the number of times of repeating S39, S41, and S43 when forming other second flattening layers 153 (first-stage second flattening layer 153, second-stage second flattening layer 153, and the like illustrated in FIG. 16) which are layers below uppermost second flattening layer 153A. Thus, the thickness of uppermost second flattening layer 153A in the Z-axis direction is made larger than that of second flattening layer 153. When raised portion 135 cannot be sufficiently flattened even when multiple second flattening layers 153 are stacked, uppermost second flattening layer 153A as the uppermost layer is formed to be thick, and the number of times of flattening accumulated raised portion 135 is increased, so that the accumulated unevenness can be flattened collectively. The condition for forming uppermost second flattening layer 153A is not limited to the condition for forming two or more smooth layers 151, and may be a condition for forming a predetermined number or more of smooth layers 151. Controller 102 may execute the mounting of the electronic components by mounting unit 23 after the shaped object is shaped. For example, controller 102 may discharge metal ink 77 from ink jet head 75 onto metal wire 95, and may cause mounting unit 23 to provide the electronic components such that the discharged ink and the terminals of the electronic components are in contact with each other. Controller 102 may connect the electronic component to metal wire 95 (circuit) by baking metal ink 77 with heater 82.

As described above, according to the above embodiment, the following effects can be obtained.

Controller 102 of shaping device 10 executes a first discharging process (S11) of discharging ultraviolet curing resin 76 from above stage 52, a first flattening process (S13) of flattening ultraviolet curing resin 76 discharged in S11 by roller 79, and a first curing process (S15) of curing ultraviolet curing resin 76 flattened in S13. Controller 102 repeatedly executes S11, S13, and S15 until the thickness reaches the predetermined thickness (S17: NO) to form first flattening layer 86. Further, controller 102 executes a second discharging process (S19) of discharging second ultraviolet curing resin 76A from above stage 52 and a semi-curing process (S23) of semi-curing second ultraviolet curing resin 76A discharged in S19. Controller 102 repeatedly executes S19 and S23 until a predetermined thickness is reached (S25: NO) to form semi-cured layer 92 on stage 52. In addition, controller 102 executes a second flattening process (S27) of flattening semi-cured layer 92 by roller 79, a second curing process (S29) of curing semi-cured layer 92 flattened in S27 to form smooth layer 151, and a third discharging process (S39) of discharging third ultraviolet curing resin 76B onto smooth layer 151 cured in S29. In the third flattening process (S41) of flattening third ultraviolet curing resin 76B discharged in S39 by roller 79, controller 102 provides roller 79 at a height corresponding to height 157 of raised portion 135 formed in smooth layer 151, and increases the number of scans of flattening by roller 79 more than in S13. Controller 102 cures third ultraviolet curing resin 76B flattened in S41 (S43). Controller 102 repeatedly executes S39, S41, and S43 until the thickness reaches the predetermined thickness (S45: NO) to form second flattening layer 153 on smooth layer 151.

With this, when flattening third ultraviolet curing resin 76B discharged onto smooth layer 151, roller 79 is disposed at a height corresponding to the height of raised portion 135 of smooth layer 151 to perform the flattening. While avoiding interference between raised portion 135 and roller 79, it is possible to bring roller 79 into contact with third ultraviolet curing resin 76B discharged onto raised portion 135 and perform the flattening. In addition, by increasing the number of scans for flattening, it is possible to increase the total time during which roller 79 comes into contact with third ultraviolet curing resin 76B discharged onto raised portion 135, and it is possible to suppress an increase in raised portion 135 by transferring and removing excessive third ultraviolet curing resin 76B onto roller 79. As a result, the influence of raised portion 135 on the upper layer can be reduced.

As illustrated in FIG. 2, controller 102 of control device 26 includes first discharging section 110, first flattening section 111, first curing section 112, first flattening layer forming section 113, second discharging section 115, semi-curing section 116, semi-cured layer forming section 117, second flattening section 118, second curing section 119, third discharging section 120, third flattening section 121, third curing section 122, and second flattening layer forming section 123. First discharging section 110 and the like are, for example, processing modules achieved by executing control program 107 in the CPU of controller 102. First discharging section 110 and the like may be configured with hardware instead of software.

First discharging section 110 is a functional unit that discharges ultraviolet curing resin 76 from ink jet head 75 above stage 52. First flattening section 111 is a functional unit that flattens ultraviolet curing resin 76 discharged from first discharging section 110 by roller 79. First curing section 112 is a functional unit that cures ultraviolet curing resin 76 flattened by first flattening section 111 by curing section 74. First flattening layer forming section 113 is a functional unit that repeatedly executes S11, S13, and S15 to form first flattening layer 86 on stage 52. Second discharging section 115 is a functional unit that causes ink jet head 75 to discharge second ultraviolet curing resin 76A onto stage 52. Semi-curing section 116 is a functional unit that causes curing section 74 to further semi-cure second ultraviolet curing resin 76A discharged by second discharging section 115. Semi-cured layer forming section 117 is a functional unit that repeatedly executes S19 and S23 to form semi-cured layer 92 on stage 52. Second flattening section 118 is a functional unit that flattens semi-cured layer 92 by roller 79. Second curing section 119 is a functional unit that cures semi-cured layer 92 flattened by second flattening section 118 to form smooth layer 151. Third discharging section 120 is a functional unit that discharges third ultraviolet curing resin 76B onto smooth layer 151 cured by second curing section 119. Third flattening section 121 is a functional unit that provides roller 79 at height 157 corresponding to the height of raised portion 135 formed in smooth layer 151, increases the number of scans of the flattening by roller 79 to be larger than that in the first flattening process, and flattens third ultraviolet curing resin 76B discharged by third discharging section 120 by roller 79. Third curing section 122 is a functional unit that cures third ultraviolet curing resin 76B flattened by third flattening section 121. Second flattening layer forming section 123 is a functional unit that repeatedly executes S39, S41, and S43 to form second flattening layer 153 on smooth layer 151.

In the above embodiment, curing section 74 is an example of a curing device. Ink jet head 75 is an example of a discharging device. Ultraviolet curing resin 76 and third ultraviolet curing resin 76B are examples of first curable viscous fluid. Metal ink 77 is an example of fluid containing metal particles. Second ultraviolet curing resin 76A is an example of second curable viscous fluid. Roller 79 is an example of a flattening member. Metal wire 95 is an example of a conductor. S11 is an example of a first discharging step and a first flattening layer forming step. S13 is an example of first flattening step and a first flattening layer forming step. S15 is an example of a first curing step and a first flattening layer forming step. S19 is an example of a second discharging step and a semi-cured layer forming step. S23 is an example of a semi-curing step and a semi-cured layer forming step. S27 is an example of a second flattening step. S29 is an example of a second curing step. S31 is an example of a metal fluid discharging step. S33 is an example of a conductor forming step. S39 is an example of a third discharging step and a second flattening layer forming step. S41 is an example of a third flattening step and a second flattening layer forming step. S43 is an example of a third curing step and a second flattening layer forming step.

(3. Others)

The present disclosure is not limited to the above-described embodiment, but can be performed in various forms in which various changes and improvements are made based on the knowledge of those skilled in the art.

For example, the contents, order, and the like of each step of the manufacturing process illustrated in FIGS. 3 and 4 are examples. For example, in the manufacturing steps of FIGS. 3 and 4, first flattening layer 86 is shaped on base member 70 of stage 52, and smooth layer 151 is shaped on first flattening layer 86; however, the configuration is not limited to this. For example, semi-cured layer 92 (smooth layer 151) may be shaped on base member 70, first flattening layer 86 may be shaped on smooth layer 151, and smooth layer 151 may be further shaped on first flattening layer 86.

In S41, controller 102 may place the height of roller 79 at a position where roller 79 contacts raised portion 135. Accordingly, the height corresponding to the height of raised portion 135 of the present disclosure can be appropriately changed according to the size, shape, and the like of raised portion 135.

Controller 102 shortens the distance between the upper surface of second layer 156 and roller 79 as compared to first layer 155, but may make the distance equal thereto or longer. Controller 102 needs not increase the number of cycles of S39, S41, and S43 in the shaping of uppermost second flattening layer 153A.

Controller 102 needs not move stage 52 in the direction opposite to rotation direction 131 of roller 79 in at least one of S13 and S41. For example, controller 102 may execute the flattening by setting the movement direction of stage 52 to the same direction as rotation direction 131.

In S27, controller 102 may move stage 52 in a direction opposite to rotation direction 131.

In at least one of S13 and S41, controller 102 may set the rotation speed of roller 79 to be equal to or lower than the movement speed of stage 52.

In S27, controller 102 may make the movement speed of stage 52 higher or lower than the rotation speed of roller 79.

Controller 102 needs not form metal wire 95.

In shaping device 10, the position of roller 79 is fixed, but the position needs not be fixed. In each flattening step (process), shaping device 10 may move roller 79 in each of the X, Y, and Z axial directions to perform the flattening.

Controller 102 needs not mount the electronic components.

The first curable viscous fluid and the second curable viscous fluid of the present disclosure are not limited to ultraviolet curing resin 76, and various curable viscous fluid that are cured by light, heat, or the like may be employed. Therefore, a method of curing the first curable viscous fluid and the second curable viscous fluid is not limited to the ultraviolet ray.

The first curable viscous fluid and the second curable viscous fluid may be different types of curable viscous fluid.

The fluid containing metal particles of the present disclosure is not limited to metal ink 77 containing silver, and may employ fluid containing another metal.

In the above embodiment, shaping device 10 for manufacturing a wiring board is employed as a shaping device of the present disclosure, but the present disclosure is not limited to this. As the manufacturing device of the present disclosure, various manufacturing devices that perform shaping using the first curable viscous fluid and the second curable viscous fluid can be employed.

REFERENCE SIGNS LIST

10: shaping device, 26: control device, 52: stage, 74: curing section (curing device), 75: ink jet head (discharging device), 76: ultraviolet curing resin (first curable viscous fluid), 76A: second ultraviolet curing resin (second curable viscous fluid), 76B: third ultraviolet curing resin (first curable viscous fluid), 77: metal ink (fluid containing metal particles), 79: roller (flattening member), 86: first flattening layer, 92: semi-cured layer, 93: smooth surface, 95: metal wire (conductor), 110: first discharging section, 111: flattening section, 112: first curing section, 113: first flattening layer forming section, 115: second discharging section, 116: semi-curing section, 117: semi-cured layer forming section, 118: second flattening section, 119: second curing section, 120: third discharging section, 121: third flattening section, 122: third curing section, 123: second flattening layer forming section, 131: rotation direction, 135: raised portion, 151: smooth layer, 153: second flattening layer, 153A: uppermost second flattening layer, 155: first layer, 156: second layer, 157: height, 165: first distance, 166: second distance.

The invention claimed is:

1. A shaping method comprising:

a first discharging step of discharging first curable viscous fluid from above a stage;

a first flattening step of flattening the first curable viscous fluid discharged in the first discharging step, by a flattening member;

a first curing step of curing the first curable viscous fluid flattened in the first flattening step;

a first flattening layer forming step of forming a first flattening layer on the stage by repeatedly executing the first discharging step, the first flattening step, and the first curing step;

a second discharging step of discharging second curable viscous fluid from above the stage;

a semi-curing step of semi-curing the second curable viscous fluid discharged in the second discharging step;

a semi-cured layer forming step of forming a semi-cured layer on the stage by repeatedly executing the second discharging step and the semi-curing step;

a second flattening step of flattening the semi-cured layer by the flattening member;

a second curing step of curing the semi-cured layer flattened in the second flattening step to form a smooth layer;

a third discharging step of discharging the first curable viscous fluid onto the smooth layer cured in the second curing step;

a third flattening step of providing the flattening member at a height corresponding to a height of a raised portion formed on the smooth layer, and flattening the first curable viscous fluid discharged in the third discharging step, by the flattening member, by increasing the number of scans of flattening by the flattening member to be larger than that in the first flattening step;

a third curing step of curing the first curable viscous fluid flattened in the third flattening step; and a second flattening layer forming step of forming a second flattening layer on the smooth layer by repeatedly executing the third discharging step, the third flattening step, and the third curing step.

2. The shaping method according to claim 1, wherein
in the second discharging step, the second curable viscous
fluid is discharged onto the first flattening layer, and
in the semi-cured layer forming step, the semi-cured layer
is formed on the first flattening layer by repeatedly
executing the second discharging step and the semi-
curing step.

3. The shaping method according to claim 1, wherein
in the third flattening step, as the height corresponding to
the height of the raised portion, a height at which the
flattening member is not in contact with the raised
portion and the flattening member is in contact with the
first curable viscous fluid discharged onto the raised
portion in the third discharging step is used.

4. The shaping method according to claim 1, wherein
in the second flattening layer forming step, the second
flattening layer including a first layer on the smooth
layer and a second layer on the first layer is formed,
in the third flattening step of forming the first layer,
flattening is executed with a distance between an upper
surface of the smooth layer and the flattening member
as a first distance,
in the third flattening step of forming the second layer,
flattening is executed with a distance between an upper
surface of the first layer and the flattening member as
a second distance, and
the second distance is shorter than the first distance.

5. The shaping method according to claim 1, wherein
in the second flattening layer forming step of alternately
forming and stacking the smooth layer and the second
flattening layer and forming an uppermost second flat-
tening layer, which is a second flattening layer located
at an uppermost layer among stacked multiple second
flattening layers, the number of times of repeating the
third discharging step, the third flattening step, and the third curing step is increased to be larger than the
number of times of repeating in the second flattening
layer forming step of forming other second flattening
layers, which are layers below the uppermost second
flattening layer, to increase a thickness of the second
flattening layer.

6. The shaping method according to claim 1, wherein
the flattening member is a roller,
in the first flattening step and the third flattening step, the
first curable viscous fluid is flattened by the roller, and
the stage is moved in a direction opposite to a rotation
direction of the roller to flatten the first curable viscous
fluid, and
in the second flattening step, the semi-cured layer is
flattened by the roller, and the stage is moved in the
same direction as the rotation direction of the roller to
flatten the semi-cured layer.

7. The shaping method according to claim 6, wherein
in the first flattening step and the third flattening step, a
rotation speed of the roller is set to be higher than a
movement speed of the stage, and
in the second flattening step, the movement speed of the
stage and the rotation speed of the roller are set to be
the same.

8. The shaping method according to claim 1, further
comprising:
a metal fluid discharging step of discharging fluid con-
taining metal particles onto a smooth surface of the
smooth layer; and
a conductor forming step of curing the fluid containing the
metal particles discharged in the metal fluid discharg-
ing step to form a metal conductor on the smooth
surface.

* * * * *